US010659952B2

(12) United States Patent
Wang et al.

(10) Patent No.: US 10,659,952 B2
(45) Date of Patent: May 19, 2020

(54) NETWORK SLICE SELECTION POLICY UPDATING METHOD AND APPARATUS

(71) Applicant: Huawei Technologies Co., Ltd., Shenzhen (CN)

(72) Inventors: Yuan Wang, Shanghai (CN); Zhongping Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/388,616

(22) Filed: Apr. 18, 2019

(65) Prior Publication Data

US 2019/0261159 A1 Aug. 22, 2019

Related U.S. Application Data

(63) Continuation of application No. PCT/CN2017/083648, filed on May 9, 2017.

(51) Int. Cl.
*H04W 8/08* (2009.01)
*H04W 48/00* (2009.01)
(Continued)

(52) U.S. Cl.
CPC ............. *H04W 8/08* (2013.01); *H04W 48/14* (2013.01); *H04W 48/16* (2013.01); *H04W 48/17* (2013.01); *H04W 48/18* (2013.01); *H04W 60/00* (2013.01); *H04W 76/11* (2018.02); *H04W 76/12* (2018.02); *H04W 76/18* (2018.02); *H04W 80/10* (2013.01)

(58) Field of Classification Search
CPC ....... H04W 8/08; H04W 76/11; H04W 80/10; H04W 48/18; H04W 60/00; H04W 48/17
See application file for complete search history.

(56) References Cited

U.S. PATENT DOCUMENTS

2017/0303259 A1* 10/2017 Lee .................. H04W 28/16
2018/0176858 A1* 6/2018 Wang ................ H04W 76/11
(Continued)

FOREIGN PATENT DOCUMENTS

CN 103906131 A 7/2014
CN 106060900 A 10/2016
(Continued)

OTHER PUBLICATIONS

Machine Translation and Abstract of Chinese Publication No. CN106572516, Apr. 19, 2017, 51 pages.
(Continued)

*Primary Examiner* — Brian D Nguyen
(74) *Attorney, Agent, or Firm* — Conley Rose, P.C.

(57) ABSTRACT

A network slice selection policy updating method includes sending, by a terminal device, configured network selection assistance information on the terminal device to an access and mobility management function (AMF), where the configured network selection assistance information includes a first slice identifier. The method further includes receiving, by the terminal device, allowed network selection assistance information and indication information that are returned by the AMF, where the allowed network selection assistance information includes a second slice identifier, and the indication information indicates that the second slice identifier corresponds to the first slice identifier.

23 Claims, 8 Drawing Sheets

(51) Int. Cl.
*H04W 48/18* (2009.01)
*H04W 60/00* (2009.01)
*H04W 76/11* (2018.01)
*H04W 80/10* (2009.01)
*H04W 76/12* (2018.01)
*H04W 76/18* (2018.01)
*H04W 48/16* (2009.01)
*H04W 48/14* (2009.01)

(56) References Cited

U.S. PATENT DOCUMENTS

| | | | | |
|---|---|---|---|---|
| 2018/0227978 A1* | 8/2018 | Keller | | H04W 4/14 |
| 2018/0324577 A1* | 11/2018 | Faccin | | H04W 8/06 |
| 2018/0324583 A1* | 11/2018 | Nair | | H04W 76/11 |
| 2019/0020996 A1* | 1/2019 | Zhang | | H04W 8/14 |
| 2019/0037636 A1* | 1/2019 | Kim | | H04W 8/02 |

FOREIGN PATENT DOCUMENTS

| | | |
|---|---|---|
| CN | 106572516 A | 4/2017 |
| WO | 2016058482 A1 | 4/2016 |
| WO | 2017063708 A1 | 4/2017 |

OTHER PUBLICATIONS

"3rd Generation Partnership Project; Technical Specification Group Services and System Aspects; System Architecture for the 5G System; Stage 2 (Release 15)," 3GPP TS 23.501, V0.4.0, Apr. 2017, 124 pages.

"3rd Generation Partnership Project; Technical Specification Group Services and System Aspects; Procedures for the 5G System; Stage 2 (Release 15)," 3GPP TS 23.502, V0.3.0, Mar. 2017, 115 pages.

"3rd Generation Partnership Project; Technical Specification Group Services and System Aspects; Study on Architecture for Next Generation System (Release 14)," 3GPP TR 23.799, V14.0.0, Dec. 2016, 522 pages.

Qualcomm Incorporated, "TS 23.501: Handling of conflicting S-NS-SAIs," SA WG2 Meeting #S2-120 S2-171708, Mar. 27-31, 2017, Busan, South Korea, 5 pages.

Samsung, et al., "TS 23.501: PLMN-specific NSSAI," SA WG2 Meeting #120, S2-171891 (was S2-17xxxx), Mar. 27-31, 2017, Busan, South Korea, 5 pages.

Foreign Communication From a Counterpart Application, PCT Application No. PCT/CN2017/083648, English Translation of International Search Report dated Jan. 31, 2018, 2 pages.

HTC ,"Sending Slice related information to the UE during temp id relocation procedure," SA WG2 Meeting #120, Busan, Korea, S2-171846, Mar. 27-31, 2017, 3 pages.

7oreign Communication From a Counterpart Application, European Application No. 17909627.6, Extended European Search Report dated Sep. 26, 2019, 11 pages.

Machine Translation and Abstract of Chinese Publication No. CN103906131, dated Jul. 2, 2014, 45 pages.

Machine Translation and Abstract of Chinese Publication No. CN106060900, dated Oct. 26, 2016, 20 pages.

Foreign Communication From a Counterpart Application, Chinese Application No. 201780038898.3, Chinese Office Action dated Feb. 3, 2020, 14 pages.

* cited by examiner

NETWORK SLICE SELECTION POLICY UPDATING METHOD AND APPARATUS

CROSS-REFERENCE

This application is a continuation of International Patent Application No. PCT/CN2017/083648, filed on May 9, 2017, which is hereby incorporated by reference in its entirety.

TECHNICAL FIELD

The present application relates to the field of communications technologies, and in particular, to a network slice selection policy updating method and an apparatus.

BACKGROUND

In a future communications system of the 3rd Generation Partnership Project (3GPP), a network may be divided into a plurality of logical network slice instances of a core network on a set of physical devices of the core network using a slicing technology. Each network slice instance of the core network may be customized based on a specific commercial scenario or a specific user requirement, to ensure isolation between network slice instances while satisfying diversified services. An operator can satisfy a specific requirement of each service by freely and flexibly combining network performance indicators such as a rate, a capacity, coverage, a delay, reliability, security, and availability.

Generally, the network slice instance of the core network is briefly referred to as a network slice. Introduction of the network slice puts forwards a new requirement on a selection policy on a terminal side. The network includes the plurality of customized network slice instances of the core network, each slice instance may serve a particular user group, and some complex terminals further have a capability and a requirement of simultaneously accessing a plurality of network slice instances. Therefore, the terminal needs to know a correspondence between an application (App) of the terminal and a slice type.

For example, when an application of a terminal requests a service, the terminal needs to know a type of a network slice that the application needs to access, and provide corresponding assistance information to assist network slice selection and user plane session establishment. In addition, when a plurality of protocol data unit (PDU) sessions currently have been established on a terminal side, and a new application on the terminal side requests a service, the terminal needs to determine whether a currently established PDU session can satisfy a service request of the new application. If all currently existing PDU sessions cannot satisfy the service request of the new application, the terminal further initiates a new user plane session request for the new application. For example, a PDU session of an enhanced mobile broadband (eMBB) type currently has been established on the terminal side. A new application on the terminal side needs to send service data. If the application also requires the PDU session of the eMBB type, the terminal side may directly send the service data of the application using the currently established PDU session of the eMBB type. However, if the application requires a PDU session of an Internet of Things (IoT) type, the terminal needs to initiate a new PDU session establishment request, to establish the PDU session of the IoT type.

In an existing solution of a 3GPP standard, a terminal device is, for example, user equipment (UE), and a preconfigured network slice selection policy (NSSP) is stored on a UE side. The NSSP may be configured by an operator for the UE, for example, stored in a subscriber identity module card (SIM), or may be preconfigured when the terminal device is delivered from a factory, or may be configured on the UE when an application is installed.

The NSSP includes a mapping relationship between an application and a service/slice type (SST). When an application is started, the UE maps the application to an SST using the NSSP. If a currently existing PDU session can support the SST, the UE sends a data stream of the application using the PDU session. If no PDU session currently can support the SST, the UE initiates a new PDU session establishment request that carries the SST.

The foregoing solution has a problem: The configured SST on the UE side changes and is updated by a network side in an actual process. In an access procedure discussed in an existing 3GPP standard, the UE provides a configured SST in an Attach message. After accepting access by the UE, the network side returns an Accepted SST to the UE in an Attach Accept message. The configured SST is not completely consistent with the accepted SST in many scenarios. As a result, the UE initiates a PDU session establishment request, causing network resource waste.

SUMMARY

Embodiments of the present application provide a network slice selection policy updating method and an apparatus, to save network resources.

According to a first aspect, an embodiment of the present application provides a network slice selection policy updating method. The method includes sending, by a terminal device, configured network selection assistance information on the terminal device to an access and mobility management function (AMF), where the configured network selection assistance information includes a first slice identifier; and receiving, by the terminal device, allowed network selection assistance information and indication information that are returned by the AMF, where the allowed network selection assistance information includes a second slice identifier, and the indication information indicates that the second slice identifier corresponds to the first slice identifier.

In this embodiment, two pieces of information may be preconfigured on the terminal device, and are respectively the network selection assistance information and a network slice selection policy. The network selection assistance information may be a set of SSTs. The network slice selection policy may be a correspondence between an application and an SST. One application may correspond to one or more network slices. The network selection assistance information sent by the terminal device may be all slice identifiers included in SSTs on the terminal device. In other words, the network selection assistance information may be a set of the slice identifiers. The allowed network selection assistance information indicates slices that can be used. Generally, the network slices that can be used are a subset of the set of the slice identifiers in the configured network selection assistance information, and namely, are some slice identifiers selected from the set of the slice identifiers. However, network slices respectively corresponding to a slice identifier on a network side and a slice identifier on a terminal device side may be inconsistent. This is described above, and details are not described herein again. Therefore, the second slice identifier included in the allowed network selection assistance information may not be the slice identifier included in the configured network selection assistance information. However, a service provided by a network slice corresponding to the second slice identifier may be the same as a service provided by a network slice corresponding to the first slice identifier. In addition, the service provided by the network slice corresponding to the second slice identifier may include the service provided by the network slice corresponding to the first slice identifier, and a service provided by a network slice corresponding to another slice identifier. For example, an identifier 1 corresponds to an Massive Internet of Things (mIoT) slice, and the slice provides an mIoT service; an identifier 2 corresponds to an eMBB slice, and the slice provides an eMBB service. An identifier 3 corresponds to a slice X, and the slice X may provide the mIoT service and the eMBB service. The indication information may explicitly indicate that the second slice identifier corresponds to the first slice identifier, or may implicitly indicate that the second slice identifier corresponds to the first slice identifier. For example, in the implicit manner, the first slice identifier and the second slice identifier are placed in an entry, or there may be other agreed-on manners. Details are not described herein.

The allowed network selection assistance information may be determined by the AMF, or may be sent by another device on the network side to the AMF, or may be determined based on a network deployment or a local policy. A specific manner of determining is not uniquely limited in this embodiment of the present application.

As can be learned from the foregoing technical solution, the allowed network selection assistance information includes the second slice identifier, and the indication information indicates that the second slice identifier corresponds to the first slice identifier. Therefore, it can be ensured that when the first slice identifier is inconsistent with the second slice identifier, the terminal device can learn which slice identifier corresponding to an application. Therefore, this can avoid initiating an unnecessary session establishment procedure, and save network resources.

In an optional implementation, after receiving, by the terminal device, the allowed network selection assistance information and indication information that are returned by the AMF, the method further includes determining, based on a slice selection policy, that a target application corresponds to the first slice identifier, where the slice selection policy includes a correspondence between the target application and the slice identifier; determining, based on the indication information, that the first slice identifier corresponds to the second slice identifier; and transmitting data of the target application using a session corresponding to the second slice identifier.

In this embodiment, the slice selection policy may be the configured NSSP described above. The configured NSSP includes a correspondence between an application and a network slice identifier. The target application is an application of the terminal device. It may be determined based on the configured NSSP that the target application corresponds to the first slice identifier. Because the indication information indicates that the first slice identifier corresponds to the second slice identifier, if the session corresponding to the second slice identifier has been established, the terminal device can learn that the previously established session corresponding to the second slice identifier supports the first slice identifier. Therefore, the data of the target application can be directly transmitted using the session corresponding to the second slice identifier, and establishment of a session corresponding to the first slice identifier does not need to be initiated to the AMF. Therefore, this can avoid initiating an unnecessary session establishment procedure, thereby saving network resources, while the data of the target application can be transmitted more quickly.

In an optional implementation, because the session corresponding to the second slice identifier may have been established or may have not been established, this embodiment of the present application further provides different processing solutions in the two cases. Details are as follows. Transmitting data of the target application using a session corresponding to the second slice identifier includes sending, by the terminal device, a session establishment request including the second slice identifier to a network, establishing the session corresponding to the second slice identifier, and transmitting the data of the target application using the session corresponding to the second slice identifier; or if the terminal device has established the session corresponding to the second slice identifier, transmitting the data of the target application using the session corresponding to the second slice identifier.

In an optional implementation, an example of a session type is further provided. The session corresponding to the second slice identifier includes a PDU session corresponding to the second slice identifier. It may be understood that based on different service requirements of the terminal device and the network side, a session that needs to be established for the application may further be another type of session. Therefore, the PDU session is a possible example, and shall not be understood as unique limitation on this embodiment of the present application.

In an optional implementation, based on the foregoing description, this embodiment further provides a specific parameter of a slice identifier in the following: the first slice identifier and the second slice identifier are both identifiers of an SST. It may be understood that slice identifiers need to have a feature of distinguishing between different slices. Therefore, the slice identifier may be unique identification information in a network. Therefore, the identifier of the SST shall not be understood as unique limitation on an implementation of the slice identifier in this embodiment of the present application.

In an optional implementation, a manner of sending the network selection assistance information and an implementation of returning the allowed network selection assistance information and the indication information by the AMF are further provided. Details are as follows. Sending, by a terminal device, configured network selection assistance information on the terminal device to an AMF includes sending, by the terminal device, a registration request to the AMF, where the registration request carries the configured network selection assistance information on the terminal device. Additionally, receiving, by the terminal device, the allowed network selection assistance information and indication information that are returned by the AMF includes receiving a registration request response message sent by the AMF, where the registration request response message carries the allowed network selection assistance information and the indication information.

In this embodiment, information is transferred using the registration request and the registration request response message. In this way, there may be no need to add new signaling overheads. This is relatively compatible with a registration procedure. Therefore, implementation difficulty is relatively low.

In an optional implementation, the terminal device may further perform the following steps. The method further includes storing, by the terminal device, the allowed network selection assistance information and the indication information, and when the terminal device moves out of a public land mobile network (PLMN) in which the terminal device is currently located, deleting the network selection assistance information and the indication information.

Because there are different allowed network selection assistance information and different indication information for different PLMNs, the terminal device does not need to replace the configured network selection assistance information with the allowed network selection assistance information.

According to a second aspect, an embodiment of the present application provides a network slice selection policy updating method. This embodiment is relative to the embodiment provided in the first aspect. This embodiment is implemented at a peer end of the execution entity in the embodiment of the first aspect. The method includes receiving, by an AMF, configured network selection assistance information that is on a terminal device and that is sent by the terminal device, where the network selection assistance information includes a first slice identifier; determining, by the AMF, allowed network selection assistance information, where the allowed network selection assistance information includes a second slice identifier; and if there is a correspondence between the second slice identifier and the first slice identifier, sending the allowed network selection assistance information and indication information to the terminal device, where the indication information indicates that the second slice identifier corresponds to the first slice identifier.

For content such as the configured network selection assistance information on the terminal device, the slice identifier, the allowed network selection assistance information, and determining the allowed network selection assistance information by the AMF, refer to the descriptions in the foregoing embodiment, as details are not described again. In addition, an identifier correspondence table of the correspondence between the second slice identifier and the first slice identifier may be stored on the side of the AMF. The identifier correspondence table may be preconfigured.

In an optional implementation, an implementation in which the AMF obtains the configured network selection assistance information on the terminal device, and an implementation in which the AMF returns the allowed network selection assistance information and the indication information to the terminal device are further provided. The receiving configured network selection assistance information that is on a terminal device and that is sent by the terminal device includes receiving a registration request sent by the terminal device, where the registration request carries the configured network selection assistance information on the terminal device. Additionally, the sending the allowed network selection assistance information and indication information to the terminal device includes sending a registration request response message to the terminal device, where the registration request response message carries the allowed network selection assistance information and the indication information.

In this embodiment, information that needs to be exchanged in this embodiment of the present application is carried by a message used in a registration process of the terminal device. In this way, there may be no need to add new signaling overheads. This is relatively compatible with a registration procedure. Therefore, implementation difficulty is relatively low.

According to a third aspect, an embodiment of the present application provides a network slice selection control method. The method includes sending, by a terminal device, a session establishment request to an AMF, to request to establish a session of a first slice identifier corresponding to a first target application, and receiving, by the terminal device, a session establishment complete message returned by the AMF, where the session establishment complete message carries an identifier of the newly established session, and a slice identifier supported by the session.

In this embodiment, the terminal device initiates the session establishment request to the AMF, and notifies the AMF of the slice identifier of the session that the terminal device requires to establish. The AMF establishes the session in response to the request of the terminal device, and notifies, using the session establishment complete message, the terminal device of the slice identifier supported by the newly established session. It may be understood that if the slice identifier supported by the session includes only the first slice identifier, the slice identifier supported by the session may not need to be included. Therefore, the slice identifier supported by the session herein may include another identifier in addition to the first slice identifier. Therefore, the terminal device can learn that the session supports the other slice identifier in addition to the first slice identifier. In this way, when determining, based on the slice selection policy, that an application corresponds to the other slice identifier, the terminal device can transmit data by learning the newly established session, and does not need to initiate a new session establishment procedure. Therefore, this can save network resources, and data of a target application can be transmitted more quickly.

In an optional implementation, after receiving, by the terminal device, a session establishment complete message returned by the AMF, the method further includes determining, by the terminal device, a second slice identifier corresponding to a second target application, and if the slice identifier supported by the session includes the second slice identifier, transmitting data of the second target application using the session.

Based on the foregoing descriptions, this embodiment provides an application example in which when the second target application corresponds to the second slice identifier, and the second slice identifier is a slice identifier supported by the established session, a new session establishment procedure does not need to be initiated.

According to a fourth aspect, an embodiment of the present application provides a network slice selection control method. This embodiment is relative to the embodiment provided in the third aspect. This embodiment is implemented at a peer end of the execution entity in the embodiment of the third aspect. The method includes receiving, by an AMF, a session establishment request sent by a terminal device, where the session establishment request requests to establish a session of a first slice identifier corresponding to a first target application; establishing, by the AMF, a session for the terminal device, and obtaining information about a network slice supported by the session; and returning, by the AMF, a session establishment complete message to the terminal device, where the session establishment complete message carries an identifier of the session and the information about the network slice supported by the session.

For content such as the session establishment request, the slice identifier, the information about the network slice supported by the session, and the session establishment complete message, refer to the descriptions in the foregoing embodiments, as details are not described again. In addition, a table of a correspondence between a session and a network slice identifier supported by the session may be stored on a side of the AMF. The correspondence table may be preconfigured. Alternatively, the correspondence table may not exist on the side of the AMF, and is stored in another network device.

In an optional implementation, an implementation of the obtaining, by the AMF, information about a network slice supported by the session is further provided. In an optional implementation, the obtaining information about the network slice supported by the session includes obtaining a session attribute of the session from a session management function (SMF), where the session attribute includes the information about the network slice supported by the session.

Because the SMF has a function of managing the session attribute, the AMF may obtain, from the SMF, the session attribute of the newly established session, and obtain, from the session attribute, the information about the network slice supported by the session.

According to a fifth aspect, an embodiment of the present application provides a network slice selection control method. The method includes determining, by a terminal device, a second slice identifier corresponding to a second target application, and sending a session establishment request to an AMF, where the session establishment request carries the second slice identifier; receiving, by the terminal device, a session establishment rejection message returned by the AMF, where the session establishment rejection message indicates an identifier of a first session, the first session is a session established between the terminal device and a network side, and the first session supports the second slice identifier; and transmitting, by the terminal device, data of the second target application using the first session.

In this embodiment, the terminal device initiates the session establishment request to the AMF, and notifies the AMF of the slice identifier corresponding to a session that the terminal device currently requests to establish. If a side of the AMF learns that the session that has been established for the terminal device supports the slice identifier, the request of the terminal device for establishing the session may be rejected, and the terminal device is notified of the session that supports the slice identifier. In a manner of notifying the terminal device of the session, the session establishment rejection message may indicate the identifier of the session. On a side of the terminal device, the session establishment rejection message is received, and the identifier of the first session is obtained through parsing. In this way, it may be learned that a rejection reason is that the session corresponding to the identifier of the first session supports the second slice identifier, and the data of the second target application may be transmitted using the first session. Therefore, an unnecessary session is not newly established, and a technical effect of saving network resources can still be achieved.

According to a sixth aspect, an embodiment of the present application provides a network slice selection control method. This embodiment is relative to the embodiment provided in the fifth aspect. This embodiment is implemented at a peer end of the execution entity in the embodiment of the fifth aspect. The method includes receiving, by an AMF, a session establishment request sent by a terminal device, where the session request carries a second slice identifier; and if a first session supports the second slice identifier, returning a session establishment rejection message to the terminal device, where the session establishment rejection message indicates an identifier of the first session, and the first session is a session established between the terminal device and a network side.

In this embodiment, for content such as the session establishment request, the slice identifier, and the session establishment rejection message, refer to the foregoing descriptions, as details are not described one by one again. Because the terminal device needs to initiate the session establishment request to the AMF to establish a session, the AMF also sends the session establishment rejection message to the terminal device. Therefore, an identifier of a session that has been established for the terminal device may be stored on a side of the AMF. In other words, the identifier of the first session is stored. In this way, when the terminal device initiates a new session establishment request, the identifier of the first session may be obtained, and the slice identifier supported by the first session is obtained locally or from another device.

In an optional implementation, this embodiment further provides an implementation solution in which the AMF obtains the slice identifier supported by the first session in the following manner. Before the returning a session establishment rejection message to the terminal device, the method further includes obtaining, by the AMF, a session attribute of the first session from an SMF, where the session attribute includes an identifier of a slice supported by the first session. Additionally, that a first session supports the second slice identifier is such that the identifier of the slice supported by the first session includes the second slice identifier.

It should be noted that a table of a correspondence between a session and a slice identifier supported by the session may be stored on the side of the AMF. Alternatively, a session and information about a slice identifier supported by the session are stored in another form in addition to the correspondence table. Alternatively, the slice identifier supported by the session may be stored in another device in addition to the AMF. This embodiment is implemented using a session management function of the SMF, and has relatively desirable compatibility. However, this shall not be understood as unique limitation on this embodiment of the present application.

According to a seventh aspect, an embodiment of the present application further provides a terminal device, The terminal device includes a sending unit, configured to send configured network selection assistance information on the terminal device to AMF, where the network selection assistance information includes a first slice identifier. The terminal device further includes a receiving unit, configured to receive allowed network selection assistance information and indication information that are returned by the AMF, where the allowed network selection assistance information includes a second slice identifier, and the indication information indicates that the second slice identifier corresponds to the first slice identifier.

In an optional implementation, the terminal device further includes an identifier determining unit, configured such that after the receiving unit receives the allowed network selection assistance information and the indication information that are returned by the AMF, the determining unit determines, based on a slice selection policy, that a target application corresponds to the first slice identifier, where the slice selection policy includes a correspondence between the target application and the slice identifier, and determines, based on the indication information, that the first slice identifier corresponds to the second slice identifier. Additionally, the sending unit is configured to transmit data of the target application using a session corresponding to the second slice identifier.

In an optional implementation, that the sending unit is configured to transmit data of the target application using a session corresponding to the second slice identifier includes the sending unit being configured to send a session establishment request including the second slice identifier to a network, establish the session corresponding to the second slice identifier, and transmit the data of the target application using the session corresponding to the second slice identifier; or if the terminal device has established the session corresponding to the second slice identifier, transmit the data of the target application using the session corresponding to the second slice identifier.

In an optional implementation, the session corresponding to the second slice identifier includes a PDU session corresponding to the second slice identifier.

In an optional implementation, that the sending unit is configured to send configured network selection assistance information on the terminal device to an AMF includes the sending unit being configured to send a registration request to the AMF, where the registration request carries the configured network selection assistance information on the terminal device. Additionally, that the receiving unit is configured to receive allowed network selection assistance information and indication information that are returned by the AMF includes the receiving unit being configured to receive a registration request response message sent by the AMF, where the registration request response message carries the allowed network selection assistance information and the indication information.

According to an eighth aspect, an embodiment of the present application further provides an access and mobility management function, including a receiving unit, configured to receive configured network selection assistance information that is on a terminal device and that is sent by the terminal device, where the network selection assistance information includes a first slice identifier. The access and mobility management function further includes an information determining unit configured to determine allowed network selection assistance information, where the allowed network selection assistance information includes a second slice identifier, and a sending unit configured such that if there is a correspondence between the second slice identifier and the first slice identifier, the sending unit sends the allowed network selection assistance information and indication information to the terminal device, where the indication information indicates that the second slice identifier corresponds to the first slice identifier.

In an optional implementation, the receiving unit is configured to receive a registration request sent by the terminal device, where the registration request carries the configured network selection assistance information on the terminal device. Additionally, that the sending unit is configured to send the allowed network selection assistance information and the indication information to the terminal device includes the sending unit being configured to send a registration request response message to the terminal device, where the registration request response message carries the allowed network selection assistance information and the indication information.

According to a ninth aspect, an embodiment of the present application further provides a terminal device, including a sending unit configured to send a session establishment request to an AMF, and to request to establish a session of a first slice identifier corresponding to a first target application. The terminal device further includes a receiving unit configured to receive a session establishment complete message returned by the AMF, where the session establishment complete message carries an identifier of the newly established session, and a slice identifier supported by the session.

In an optional implementation, the terminal device includes an identifier determining unit configured such that after the receiving unit receives the session establishment complete message returned by the AMF, the identifier determining unit determine determines, by the terminal device, a second slice identifier corresponding to a second target application. The terminal device further includes a transmission unit configured to such that if the slice identifier supported by the session includes the second slice identifier, the transmission unit transmits data of the second target application using the session.

According to a tenth aspect, an embodiment of the present application further provides an access and mobility management function, including a receiving unit configured to receive a session establishment request sent by a terminal device, where the session establishment request requests to establish a session of a first slice identifier corresponding to a first target application. The access and mobility management function further includes a session establishment unit configured to establish a session for the terminal device, an information obtaining unit configured to obtain information about a network slice supported by the session, and a sending unit configured to return a session establishment complete message to the terminal device, where the session establishment complete message carries an identifier of the session and the information about the network slice supported by the session.

In an optional implementation, the information obtaining unit is configured to obtain a session attribute of the session from an SMF, where the session attribute includes the information about the network slice supported by the session.

According to an eleventh aspect, an embodiment of the present application further provides a terminal device. The terminal device includes an identifier determining unit configured to determine a second slice identifier corresponding to a second target application, and a sending unit configured to send a session establishment request to an AMF, where the session establishment request carries the second slice identifier. The terminal device further includes a receiving unit configured to receive a session establishment rejection message returned by the AMF, where the session establishment rejection message indicates an identifier of a first session, the first session is a session established between the terminal device and a network side, and the first session supports the second slice identifier; and a transmission unit configured to transmit data of the second target application using the first session.

According to a twelfth aspect, an embodiment of the present application further provides an access and mobility management function including a receiving unit configured to receive a session establishment request sent by a terminal device, where the session request carries a second slice identifier. The access and mobility management function further includes a sending unit configured such that if a first session supports the second slice identifier, the sending unit returns a session establishment rejection message to the terminal device, where the session establishment rejection message indicates an identifier of the first session, and the first session is a session established between the terminal device and a network side.

In an optional implementation, the access and mobility management function further includes an attribute obtaining unit configured such that before the sending unit returns the session establishment rejection message to the terminal device, the attribute obtaining unit obtains a session attribute of the first session from an SMF, where the session attribute includes an identifier of a slice supported by the first session. Additionally, that a first session supports the second slice identifier is such that the identifier of the slice supported by the first session includes the second slice identifier.

According to a thirteenth aspect, an embodiment of the present application further provides a terminal device including a processor, a memory, and a transceiver. The memory stores program code, and when executing the program code, the processor performs any one of the methods performed by the terminal device in the embodiments of the present application.

According to a fourteenth aspect, an embodiment of the present application further provides an access and mobility management function including a processor, a memory, and a transceiver. The memory stores program code, and when executing the program code, the processor performs any one of the methods performed by the access and mobility management function in the embodiments of the present application.

According to a fifteenth aspect, an embodiment of the present application further provides a storage medium. The storage medium includes program code. When the program code is executed, the procedure of any one of the methods provided in the embodiments of the present application is performed.

According to a sixteenth aspect, an embodiment of the present application further provides a terminal device including a processing unit and a communications unit. The processing unit is configured send, using the communications unit, configured network selection assistance information on the terminal device to an AMF, where the network selection assistance information includes a first slice identifier. The processing unit is further configured to receive, using the communications unit, allowed network selection assistance information and indication information that are returned by the AMF, where the allowed network selection assistance information includes a second slice identifier, and the indication information indicates that the second slice identifier corresponds to the first slice identifier.

In an optional implementation, the processing unit is further configured such that after receiving, using the communications unit, the allowed network selection assistance information and the indication information that are returned by the AMF, the processing unit determines, based on a slice selection policy, that a target application corresponds to the first slice identifier, where the slice selection policy includes a correspondence between the target application and the slice identifier; determines, based on the indication information, that the first slice identifier corresponds to the second slice identifier; and transmits, using the communications unit, data of the target application using a session corresponding to the second slice identifier.

In an optional implementation, that the processing unit is configured to transmit, using the communications unit, data of the target application using a session corresponding to the second slice identifier includes the processing unit being configured to send, using the communications unit, a session establishment request including the second slice identifier to a network, establish the session corresponding to the second slice identifier, and transmit the data of the target application using the session corresponding to the second slice identifier; or if the terminal device has established the session corresponding to the second slice identifier, transmit the data of the target application using the session corresponding to the second slice identifier.

In an optional implementation, the session corresponding to the second slice identifier includes a PDU session corresponding to the second slice identifier.

In an optional implementation, that the processing unit is configured to send, using the communications unit, configured network selection assistance information on the terminal device to an AMF includes the processing unit being configured to send a registration request to the AMF, where the registration request carries the configured network selection assistance information on the terminal device.

That the processing unit is configured to receive, using the communications unit, allowed network selection assistance information and indication information that are returned by the AMF includes the processing unit being configured to receive, using the communications unit, a registration request response message sent by the AMF, where the registration request response message carries the allowed network selection assistance information and the indication information.

According to a seventeenth aspect, an embodiment of the present application further provides an access and mobility management function including a processing unit and a communications unit. The processing unit is configured to receive, using the communications unit, configured network selection assistance information that is on a terminal device and that is sent by the terminal device, where the network selection assistance information includes a first slice identifier. The processing unit is further configured to determine allowed network selection assistance information, where the allowed network selection assistance information includes a second slice identifier. The processing unit is further configured such that if there is a correspondence between the second slice identifier and the first slice identifier, the processing unit sends the allowed network selection assistance information and indication information to the terminal device using the communications unit, where the indication information indicates that the second slice identifier corresponds to the first slice identifier.

In an optional implementation, the processing unit is configured to receive, using the communications unit, a registration request sent by the terminal device, where the registration request carries the configured network selection assistance information on the terminal device. Additionally, sending the allowed network selection assistance information and indication information to the terminal device includes sending a registration request response message to the terminal device, where the registration request response message carries the allowed network selection assistance information and the indication information.

According to an eighteenth aspect, an embodiment of the present application further provides a terminal device including a processing unit and a communications unit. The processing unit is configured to send, using the communications unit, a session establishment request to an AMF, to request to establish a session of a first slice identifier corresponding to a first target application. The processing unit is further configured to receive, using the communications unit, a session establishment complete message returned by the AMF, where the session establishment complete message carries an identifier of the newly established session, and a slice identifier supported by the session.

In an optional implementation, the processing unit is further configured such that after receiving, using the communications unit, the session establishment complete message returned by the AMF, the processing unit determines, by the terminal device, a second slice identifier corresponding to a second target application. The processing unit is further configured such that if the slice identifier supported by the session includes the second slice identifier, the processing unit transmits, using the communications unit, data of the second target application using the session.

According to a nineteenth aspect, an embodiment of the present application further provides an access and mobility management function including a processing unit and a communications unit. The processing unit is configured to receive, using the communications unit, a session establishment request sent by a terminal device, where the session establishment request requests to establish a session of a first slice identifier corresponding to a first target application. The processing unit is further configured to establish a session for the terminal device, and obtain information about a network slice supported by the session. The processing unit is further configured to return a session establishment complete message to the terminal device using the communications unit, where the session establishment complete message carries an identifier of the session, and the information about the network slice supported by the session.

In an optional implementation, that the processing unit is configured to obtain information about a network slice supported by the session includes the processing unit being configured to obtain a session attribute of the session from an SMF using the communications unit, where the session attribute includes the information about the network slice supported by the session.

According to a twentieth aspect, an embodiment of the present application further provides a terminal device including a processing unit and a communications unit. The processing unit is configured to determine a second slice identifier corresponding to a second target application. The processing unit is configured to send, using the communications unit, a session establishment request to an AMF, where the session establishment request carries the second slice identifier; receive a session establishment rejection message returned by the AMF, where the session establishment rejection message indicates an identifier of a first session, the first session is a session established between the terminal device and a network side, and the first session supports the second slice identifier; and transmit data of the second target application using the first session.

According to a twenty-first aspect, an embodiment of the present application further provides an access and mobility management function including a processing unit and a communications unit. The processing unit is configured to receive, using the communications unit, a session establishment request sent by a terminal device, where the session request carries a second slice identifier; and if a first session supports the second slice identifier, return a session establishment rejection message to the terminal device, where the session establishment rejection message indicates an identifier of the first session, and the first session is a session established between the terminal device and a network side.

In an optional implementation, the processing unit is further configured such that before returning the session establishment rejection message to the terminal device using the communications unit, the processing unit obtains a session attribute of the first session from an SMF using the communications unit, where the session attribute includes an identifier of a slice supported by the first session. Additionally, that a first session supports the second slice identifier is such that the identifier of the slice supported by the first session includes the second slice identifier.

According to another aspect, an embodiment of the present application provides a communications system. The system includes the access and mobility management function in the foregoing aspects. In another possible design, the system may further include another device, for example, an SMF or a terminal device that interacts with the core network interface device in the solutions provided in the embodiments of the present application.

According to another aspect, an embodiment of the present application provides a computer program. The computer program includes an instruction sequence. When the instruction sequence is executed, any one of the methods provided in the embodiments of the present application is performed.

BRIEF DESCRIPTION OF DRAWINGS

To describe the technical solutions in the embodiments of the present application or in the background more clearly, the following briefly describes the accompanying drawings required for describing the embodiments of the present application or the background.

DESCRIPTION OF EMBODIMENTS

The following describes the embodiments of the present application with reference to the accompanying drawings in the embodiments of the present application.

Functions of a 5G core network are classified into a user plane function (UPF) and a control plane function (CP). A user plane network element is mainly responsible for forwarding a data packet, controlling quality of service (QoS), collecting statistics on charging information, and the like. A control plane network element is mainly responsible for user registration verification, mobility management, and delivering to the UPF a data packet forwarding policy, a QoS control policy, and the like. Control plane network elements may be further classified into an AMF and a session management function (SMF). The AMF is responsible for executing a registration procedure when a user performs access and performing location management in a movement process of a user. The SMF is responsible for establishing a corresponding session connection on a network side when a user initiates a service, providing a specific service to the user, and in particular, delivering to the UPF a data packet forwarding policy, a QoS policy, and the like based on an N4 interface between the SMF and the UPF.

Figure 1:
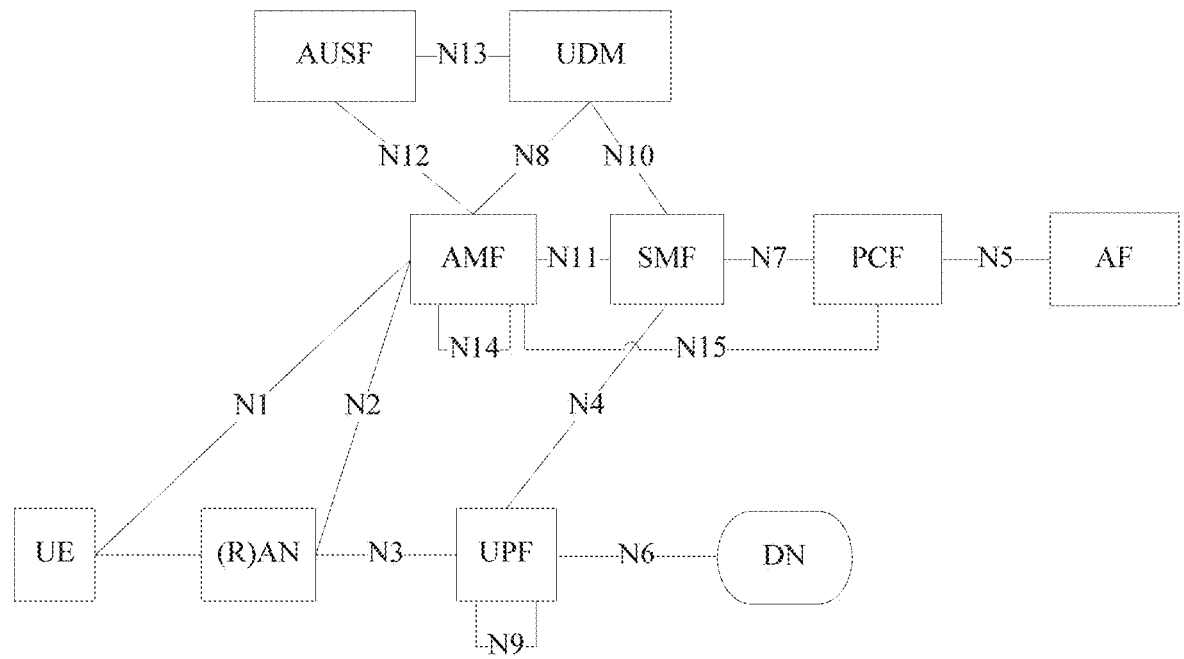
FIG. 1 is a schematic structural diagram of a system according to an embodiment of the present application.

FIG. 1 shows an example of a 5G communications system. FIG. 1 includes: a user equipment (UE), a radio access network (RAN) or an access network (AN), a user port function (UPF), a data network (DN), an AMF, an SMF, a policy control function (PCF), an application function (AF), an authentication server function (AUSF), and unified data management (UDM) that perform communication using interfaces from N1 to N15. In FIG. 1, the UE may be considered as another representation form of a terminal device.

Figure 2:
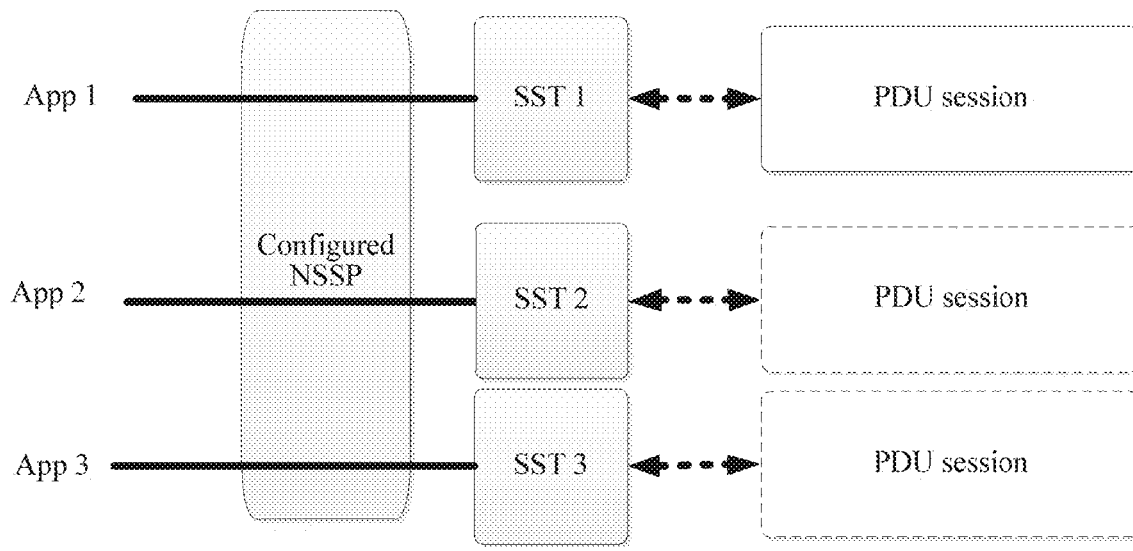
FIG. 2 is a schematic diagram of an NSSP according to an embodiment of the present application.
Figure 3:
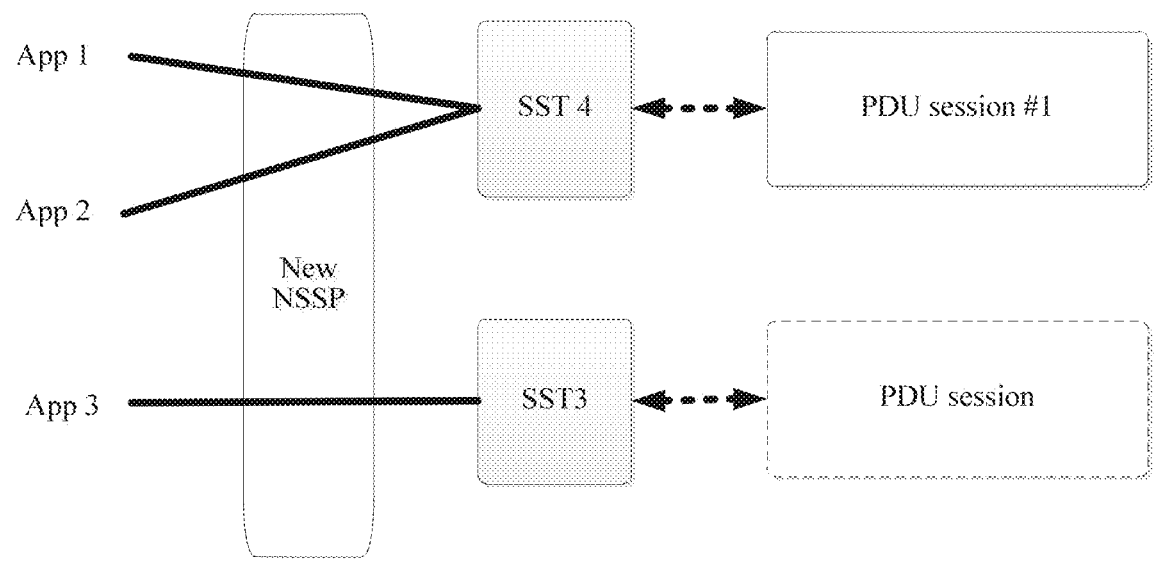
FIG. 3 is a schematic diagram of an NSSP according to an embodiment of the present application.

To more vividly describe the technical problem described in background, referring to FIG. 2 and FIG. 3, a terminal device currently has three apps that are respectively an app 1, an app 2, and an app 3. As shown in FIG. 2, in a configured NSSP, the three apps respectively correspond to three SSTs and three PDU sessions. It is assumed that the app 1 has been run, and a terminal device establishes a PDU session #1 for the app 1. When the app 2 is started, the terminal device learns, based on the NSSP, that the app 2 is associated with an SST 1. The current PDU session #1 can support the SST 1. Therefore, the terminal device sends data of the app 2 using the PDU session #1. When the app 3 is started, the terminal device learns, based on the NSSP, that the app 3 is associated with an SST 2. However, currently, no PDU session can support the SST 2. Therefore, the terminal device initiates a new PDU session establishment request, and adds the SST 2 to a request message. After establishment of the new PDU session is completed, the terminal device sends data of the app 3 using the new PDU session.

There is seemingly no technical problem in the foregoing session establishment process. However, in an actual application process, a configured SST on a side of the terminal device may change and may be updated by a network side. In an access procedure discussed in an existing standard, the terminal device provides a configured SST in an Attach message. After accepting access by the terminal device, the network side returns an Accepted SST (or it may also be referred to as an allowed SST), to the terminal device using an Attach Accept message. The two pieces of information are not completely consistent in many scenarios.

For example, in a roaming scenario, as shown in FIG. 2, a preconfigured SST list on the side of the terminal device is (1, 2, 3); and 1, 2, and 3 may all be referred to as standard values, and therefore, can be understood by a roaming network. As shown in FIG. 3, in a new NSSP, three apps correspond to two SSTs and two PDU sessions. Details are as follows. After a roaming network accepts access of a terminal device, an accepted SST list returned to the terminal device is (3, 4). Herein, 4 is a non-standard value. An SST 4 is a slice identifier of a non-standard slice self-defined in the roaming network, but the slice of slice identifier 4 can support both a service of an SST 1 and a service of an SST 2. After the terminal device stores the accepted SST list (3, 4), it does not know how to associate an app with the accepted SST list (3, 4). To be more specific, based on the configured NSSP of the terminal device, the terminal device can understand that the app 1 is associated with the SST 1, but does not know that the app 1 may be associated with the SST 4. It is assumed that the network side establishes, for the terminal device, a PDU session that supports the SST 4. When the terminal device currently needs to initiate transmission of service data of the app 1 or the app 2, the terminal device does not know that the PDU session that supports the SST 4 actually can support data transmission of the SST 1 and the SST 2. Therefore, the terminal device incorrectly considers that no PDU session can currently support the SST 1 or the SST 2. As a result, the terminal device initiates an unnecessary PDU session establishment request, causing network resource waste. Currently, there is such a gap in a standard solution, and there is no corresponding solution. The embodiments of the present application provide solutions for resolving the problem.

In the embodiments of the present application, to resolve the foregoing problem, an association between an app and an accepted SST is established, to ensure that a UE can correctly provide an SST to assist network slice selection and session establishment. In a registration process, if a configured SST and an accepted SST of the UE are inconsistent, a core network may send a new NSSP to the UE using a non-access stratum (NAS) message, in order to ensure that the UE can correctly associate an app with an accepted SST. Alternatively, the core network may notify the UE of the association in another manner. The following embodiments provide three notification manners.

In the following embodiments, a registration process or a session establishment process of a PDF session is separately used as an example for description. The following embodiments mainly include the following entity devices.

UE: In the embodiments of the present application, a UE may be a terminal device that supports a 5G network. However, a UE that can be applied in the present application is not limited to a 5G network, and may be further applied to all types of terminal devices, including: a mobile phone, an Internet of Things device, a smart household device, an industrial control device, an in-vehicle device, and the like. The technical solutions provided in the embodiments of the present application can be used as when there is a network slice selection requirement, and a terminal device has the foregoing technical problem.

Radio access network (RAN) Node: is usually a wireless base station such as an evolved NodeB (eNodeB). The UE establishes a radio channel with the RAN Node, and accesses a core network to obtain a service using the RAN Node. Therefore, in the embodiments of the present application, communication may be performed between a terminal device and an AMF through forwarding performed by the RAN Node.

AMF: is responsible for UE mobility management, session management message routing, access verification and authentication, UE context storage, and the like.

SMF: is responsible for session management, selection of a user plane functional entity, allocation of an Internet Protocol (IP) address to UE, termination of a session management NAS message, QoS execution control, and the like.

PCF: provides a network to a control plane functional entity such as an AMF or an SMF.

An example of an implementation solution is as follows below.

1.

It is assumed that an application scenario is as follows below.

A UE side stores a configured network slice selection policy (NSSP). The NSSP may be configured by an operator for the UE and may be stored in a subscriber identity module (SIM), or may be preconfigured when the terminal device is delivered from a factory, or may be configured on the UE when an app is installed. The configured NSSP currently stored by the UE is shown in the following Table 1.

TABLE 1

| App 1 | Configured SST 1 |
| App 2 | Configured SST 2 |
| App 3 | Configured SST 3 |

When initiating a registration request to a network side, the UE provides a configured SST (1, 2, 3) to the network side, or the network side obtains a configured SST (1, 2, 3) from subscription data. The network side determines an accepted SST for the UE based on a network policy (for example, a local policy, a roaming protocol, or a congestion status). The configured SST may be consistent or inconsistent with the accepted SST. For example, the accepted SST may be (1, 2, 3), or (1, 2), or the accepted SST may be (3, 4) when it is assumed that a network slice of the SST 4 supports both the SST 1 and the SST 2, or the accepted SST may be (5) when it is assumed that a slice of the SST 5 is a default slice. In the first two cases, because the technical problem resolved in the embodiments of the present application does not exist, an NSSP does not need to be updated because an app can be correctly associated with an accepted SST based on an original NSSP. However, in the last two cases, the technical solution in the embodiments of the present application may be used to resolve the above technical problem for an NSSP. Otherwise, the UE cannot correctly associate an app with an accepted SST. As a result, unnecessary session establishment is initiated.

Figure 4:
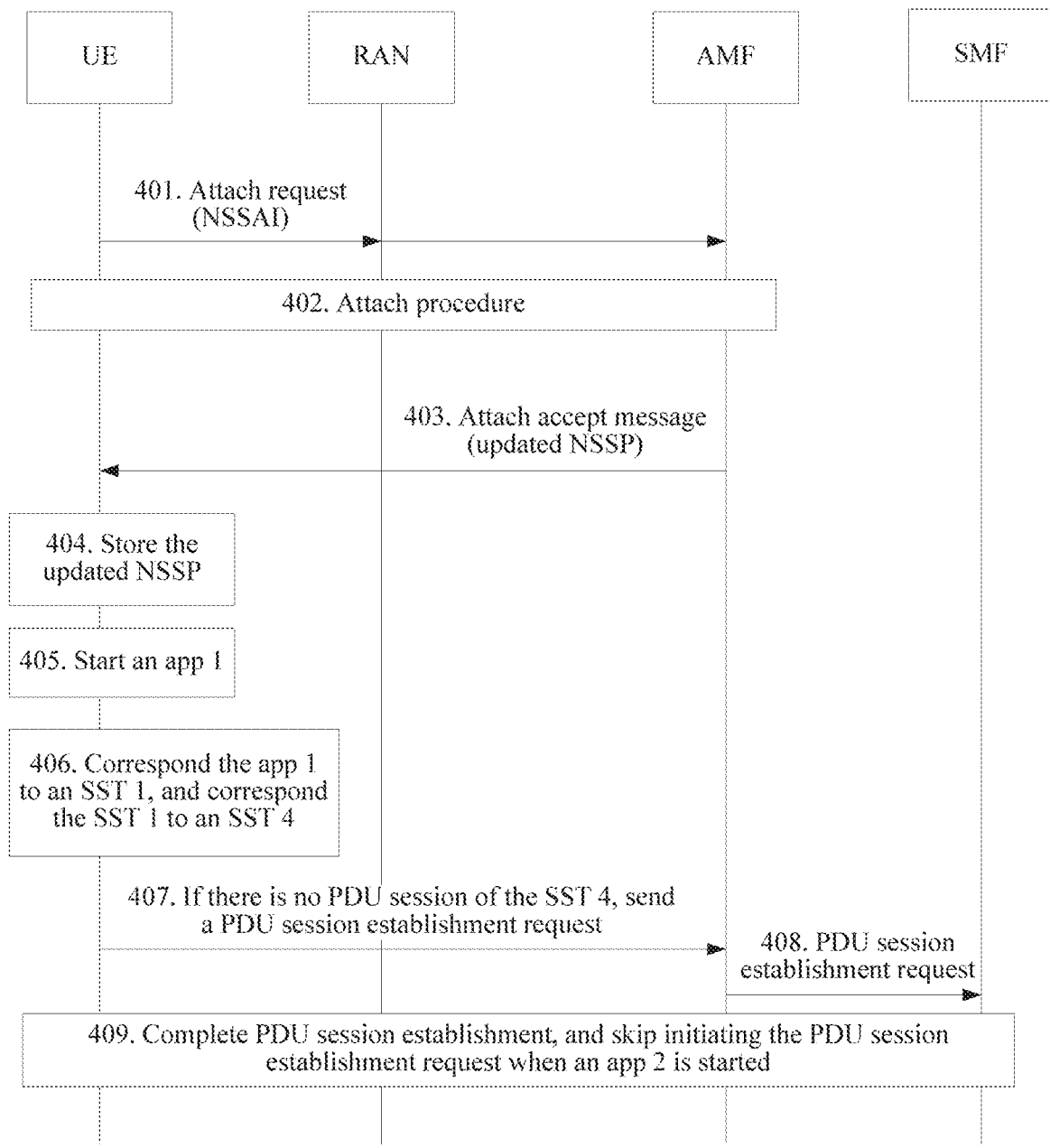
FIG. 4 is a schematic flowchart of a method according to an embodiment of the present application.

As shown in FIG. 4, a procedure includes the following.

401. UE sends a registration request such as an Attach Request message to an AMF. The attach request message may include configured network slice selection assistance information (NSSAI) on a terminal device. The configured NSSAI may be a configured SST, for example, SST (1, 2, 3).

402. A network side device and the UE perform a normal Attach procedure. Details are not described herein.

403. The AMF returns a response message such as an attach accept message to the UE. The attach accept message may include accepted NSSAI and an updated NSSP. The accepted NSSAI may include an accepted SST. The updated NSSP may include a correspondence between a configured SST and an accepted SST. For example, the accepted SST is (3, 4), and the SST 4 can support the SST 1 and the SST 2. The updated NSSP includes indication information indicating that the SST 1 corresponds to the SST 4 and the SST 2 corresponds to the SST 4. The correspondence may be indicated using a table.

404. The UE stores the updated NSSP based on an accessed public land mobile network (PLMN).

In this embodiment, the updated NSSP is bound with the currently accessed PLMN, and the UE uses the updated NSSP only within a range of the current PLMN. The updated NSSP does not replace an originally configured NSSP.

405. An app 1 on the UE side is started, and service data needs to be transmitted.

406. The UE first corresponds the app 1 to the SST 1 based on the configured NSSP that is preconfigured, and corresponds the SST 1 to the SST 4 based on the updated NSSP.

407. If no PDU session currently corresponds to the SST 4, the UE initiates a PDU session establishment request including the accepted SST 4.

408. The AMF selects an SMF based on the accepted SST 4, and forwards the PDU session establishment request to the SMF.

409. Complete PDU session establishment.

In this case, if an app 2 of the UE is started, and service data needs to be transmitted, the UE first corresponds the app 2 to the SST 2 based on the configured NSSP that is preconfigured, and corresponds the SST 2 to the SST 4 based on the updated NSSP. The UE detects that a PDU session supporting the SST 4 currently exists, the service data of the app 2 is transmitted using the PDU session, and a PDU session establishment request no longer needs to be initiated.

2.

Figure 5:
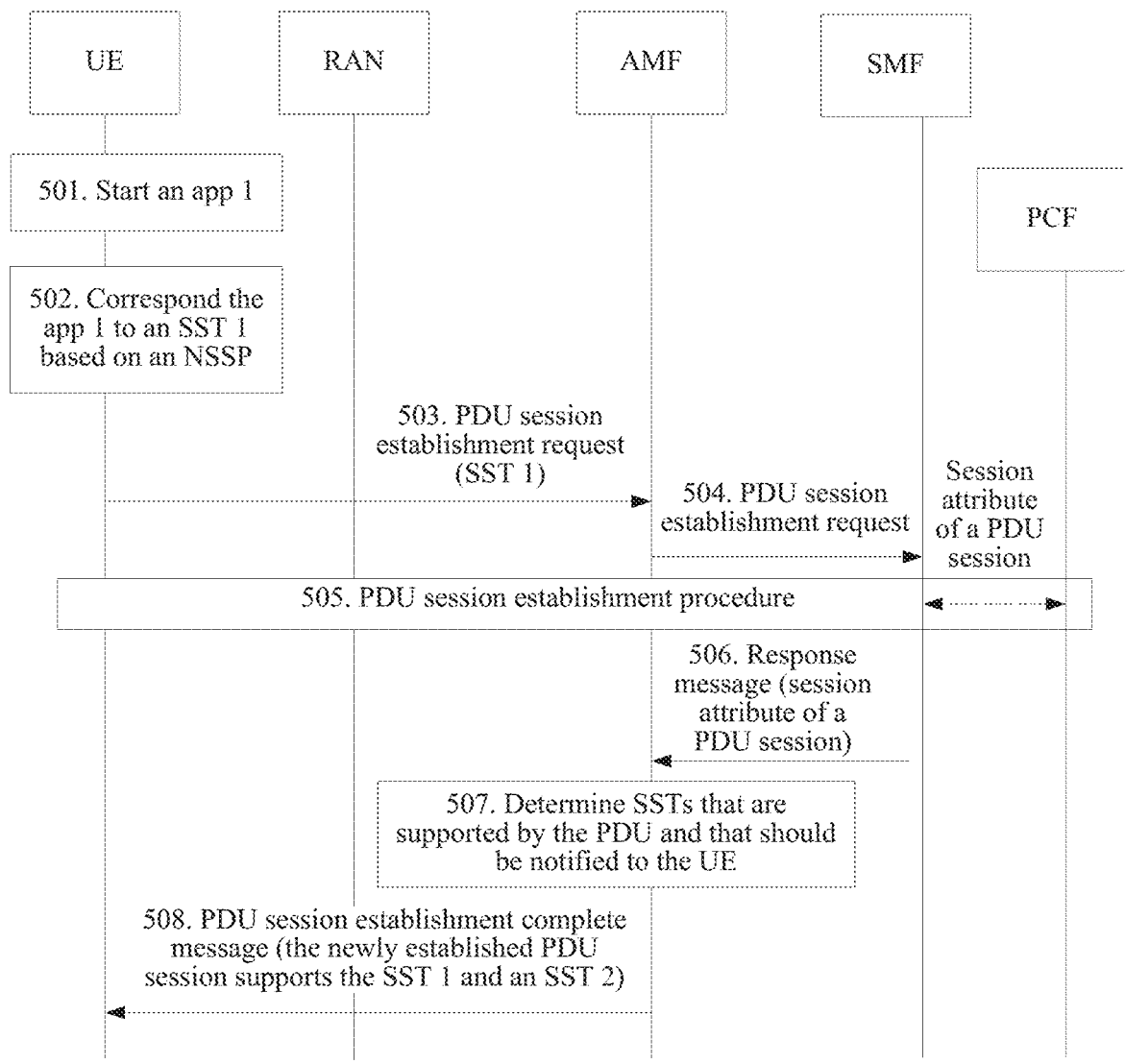
FIG. 5 is a schematic flowchart of a method according to an embodiment of the present application.

An application scenario in this embodiment is the same as that in the foregoing embodiment, and details are not described herein again. A difference is that an NSSP does not need to be updated in this embodiment, and the UE still associates an app with an SST based on a preconfigured NSSP. As shown in FIG. 5, details are as follows below.

501. Start an app 1 of the UE.

502. The UE corresponds the app 1 to an SST 1 based on a configured NSSP.

503. The UE initiates a PDU session establishment request, where the PDU session establishment request includes the configured SST 1.

504. An AMF selects an SMF based on the configured SST 1, and forwards the PDU session establishment request to the SMF.

505. The SMF performs a PDU session establishment procedure. Optionally, the SMF requests to obtain, from a PCF, a session attribute of a newly established PDU session, for example, SSTs supported by the newly established PDU session. For example, the PDU session supports the SST 1, an SST 2, an SST 4, and an SST 5.

506. After establishment of the PDU session is completed, the SMF returns a response message to the AMF to indicate that establishment of the PDU session is completed, where the message includes a PDU establishment complete message and the attribute of the PDU session.

507. The AMF determines, based on NSSAI (that is, configured SST information) in subscription data of the UE, SSTs that are supported by the PDU session and that should be notified to the UE. For example, the SST information in the subscription data of the UE is SSTs (1, 2, 3). In this case, the AMF determines to notify the UE that the newly established PDU session supports the SST 1 and the SST 2.

508. The AMF forwards a PDU session establishment complete message and the attribute of the PDU session to the UE, where the attribute of the PDU session indicates that the newly established PDU session supports the SST 1 and the SST 2.

In this case, if an app 2 of the UE is started, and service data needs to be transmitted, the UE first corresponds the app 2 to the SST 2 based on the configured NSSP preconfigured, and determines, based on the attribute of the PDU session, that the previously established PDU session supports the SST 2. The service data of the app 2 is transmitted using the PDU session, and a PDU session establishment request no longer needs to be initiated.

3.

Figure 6:
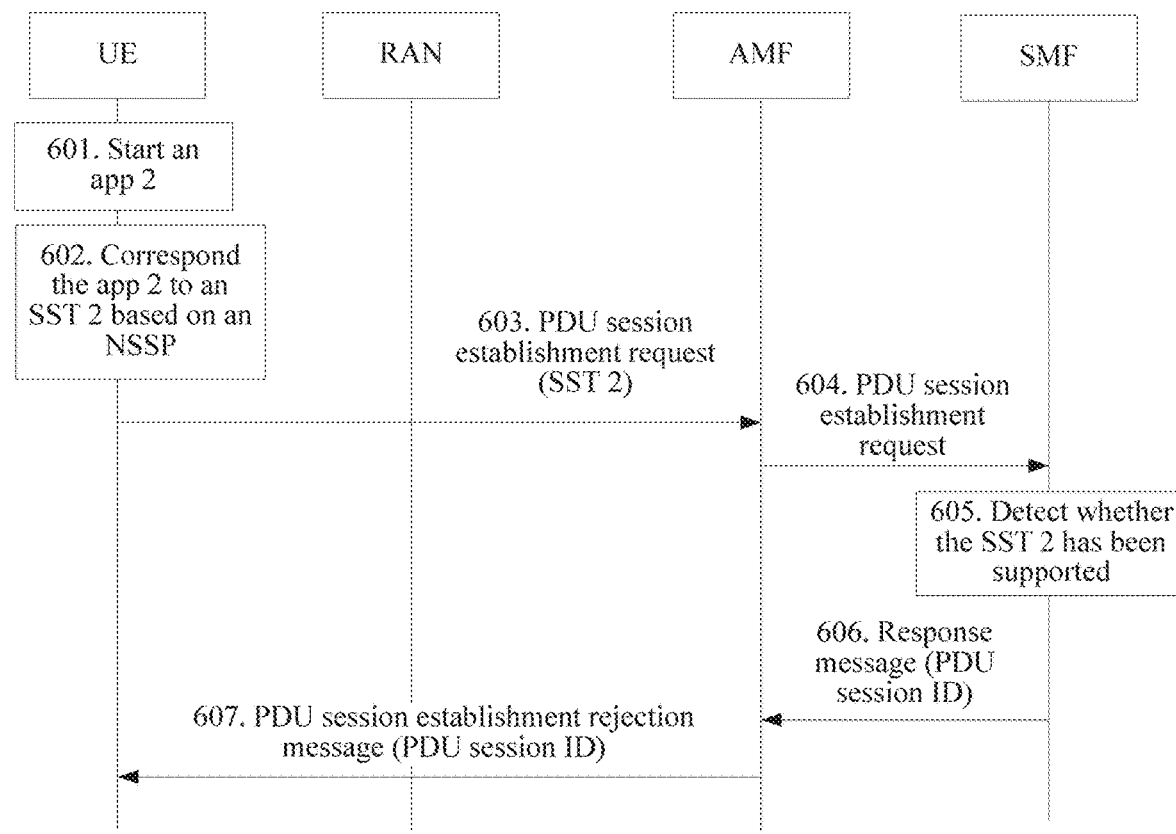
FIG. 6 is a schematic flowchart of a method according to an embodiment of the present application.

An application scenario in this embodiment is the same as that in the foregoing embodiment, and details are not described herein again. A difference is that an NSSP is not updated in this embodiment, and the UE still associates an app with an SST based on a preconfigured NSSP. As shown in FIG. 6, details are as follows below.

601. Start an app 2 of the UE.

It is assumed that an app 1 of the UE corresponds to an SST 1 and a PDU session is established.

602. The UE corresponds the app 2 to an SST 2 based on a configured NSSP.

603. The UE initiates a PDU session establishment request, where the PDU session establishment request includes the configured SST 2.

604. An AMF selects an SMF based on the configured SST 2, and forwards the PDU session establishment request to the SMF.

605. The SMF detects whether a PDU session currently established for the UE can serve as a PDU session that the PDU session establishment request requests to establish. The SMF can store an identifier (ID) of the previous PDU session and an attribute of the PDU session, that is, SSTs that are supported.

606. If a PDU session that can support the SST 2 currently exists, the SMF sends a response message to the AMF, where the response message includes a PDU session establishment rejection message including an ID of the PDU session, and the ID of the PDU session indicates the PDU session that can support the SST 2. Optionally, the response message may further include a cause value indicating the UE that rejection is performed because the PDU session that can support the requested service exists. Alternatively, there is no cause value, and when the returned PDU session establishment rejection message carries the identifier of the PDU session, it indicates by default that the PDU session that corresponds to the identifier of the PDU session and that supports the requested service exists.

607. The AMF forwards the PDU session establishment rejection message to the UE. After receiving the message, the UE determines, based on the ID of the PDU session, the currently existing PDU session, and sends service data of the app 2 using the PDU session corresponding to the ID of the PDU session.

In this embodiment, an unnecessary PDU session does not need to be newly established either.

Figure 7:
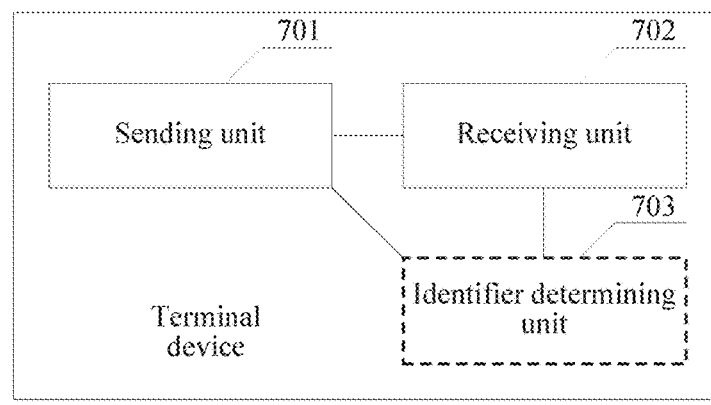
FIG. 7 is a schematic structural diagram of a terminal device according to an embodiment of the present application.

FIG. 7 is a possible schematic structural diagram of a terminal device according to the foregoing embodiment. The terminal device includes a sending unit 701 configured to send configured network selection assistance information on the terminal device to an AMF, where the network selection assistance information includes a first slice identifier. The terminal device further includes a receiving unit 702 configured to receive allowed network selection assistance information and indication information that are returned by the AMF, where the allowed network selection assistance information includes a second slice identifier, and the indication information indicates that the second slice identifier corresponds to the first slice identifier.

In an optional implementation, the terminal device further includes an identifier determining unit 703 configured to: after the receiving unit 702 receives the allowed network selection assistance information and the indication information that are returned by the AMF, determine, based on a slice selection policy, that a target application corresponds to the first slice identifier, where the slice selection policy includes a correspondence between the target application and the slice identifier; and determine, based on the indication information, that the first slice identifier corresponds to the second slice identifier. Additionally, the sending unit 701 is configured to transmit data of the target application using a session corresponding to the second slice identifier.

In an optional implementation, that the sending unit 701 is configured to transmit data of the target application using a session corresponding to the second slice identifier includes the sending unit 701 being configured to: send a session establishment request including the second slice identifier to a network, establish the session corresponding to the second slice identifier, and transmit the data of the target application using the session corresponding to the second slice identifier; or if the terminal device has established the session corresponding to the second slice identifier, transmit the data of the target application using the session corresponding to the second slice identifier.

In an optional implementation, the session corresponding to the second slice identifier includes a PDU session corresponding to the second slice identifier.

In an optional implementation, that the sending unit 701 is configured to send configured network selection assistance information on the terminal device to an AMF includes the sending unit sending a registration request to the AMF, where the registration request carries the configured network selection assistance information on the terminal device. Additionally, that the receiving unit 702 is configured to receive allowed network selection assistance information and indication information that are returned by the AMF includes the receiving unit 702 receiving a registration request response message sent by the AMF, where the registration request response message carries the allowed network selection assistance information and the indication information.

Figure 8:
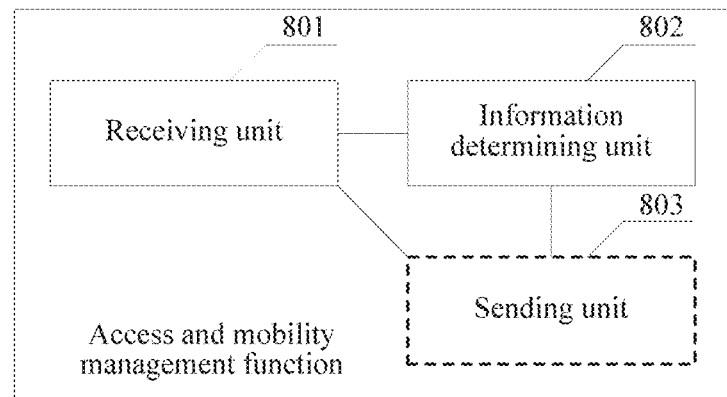
FIG. 8 is a schematic structural diagram of an access and mobility management function according to an embodiment of the present application.

FIG. 8 is a possible schematic structural diagram of an access and mobility management function according to the foregoing embodiment. The access and mobility management function includes a receiving unit 801 configured to receive configured network selection assistance information that is on a terminal device and that is sent by the terminal device, where the network selection assistance information includes a first slice identifier. The access and mobility management function further includes an information determining unit 802 configured to determine allowed network selection assistance information, where the allowed network selection assistance information includes a second slice identifier. The access and mobility management function further includes a sending unit 803 configured such that if there is a correspondence between the second slice identifier and the first slice identifier, the sending unit 803 sends the allowed network selection assistance information and indication information to the terminal device, where the indication information indicates that the second slice identifier corresponds to the first slice identifier.

In an optional implementation, the receiving unit 801 is configured to receive a registration request sent by the terminal device, where the registration request carries the configured network selection assistance information on the terminal device. Additionally, that the sending unit 803 is configured to send the allowed network selection assistance information and indication information to the terminal device includes the sending unit 803 sending a registration request response message to the terminal device, where the registration request response message carries the allowed network selection assistance information and the indication information.

Figure 9:
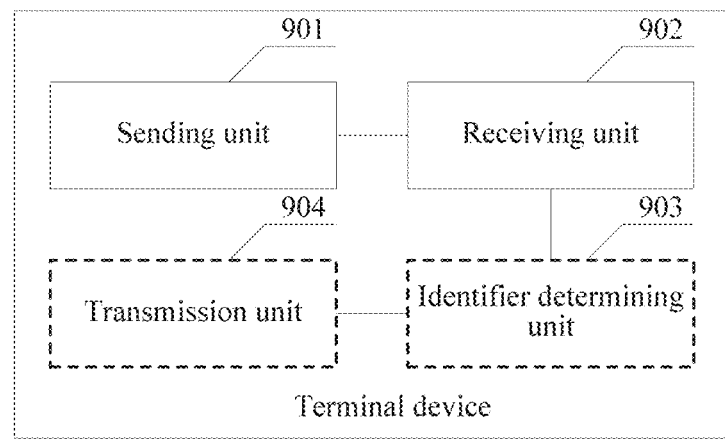
FIG. 9 is a schematic structural diagram of a terminal device according to an embodiment of the present application.

FIG. 9 is a possible schematic structural diagram of a terminal device according to the foregoing embodiment. The terminal device includes a sending unit 901 configured to send a session establishment request to an AMF, to request to establish a session of a first slice identifier corresponding to a first target application. The terminal device further includes a receiving unit 902 configured to receive a session establishment complete message returned by the AMF, where the session establishment complete message carries an identifier of the newly established session, and a slice identifier supported by the session.

In an optional implementation, the terminal device further includes an identifier determining unit 903 configured to: after the receiving unit 902 receives the session establishment complete message returned by the AMF, determine, by the terminal device, a second slice identifier corresponding to a second target application. The terminal device further includes a transmission unit 904 configured such that if the slice identifier supported by the session includes the second slice identifier, the transmission unit 904 transmits data of the second target application using the session.

Figure 10:
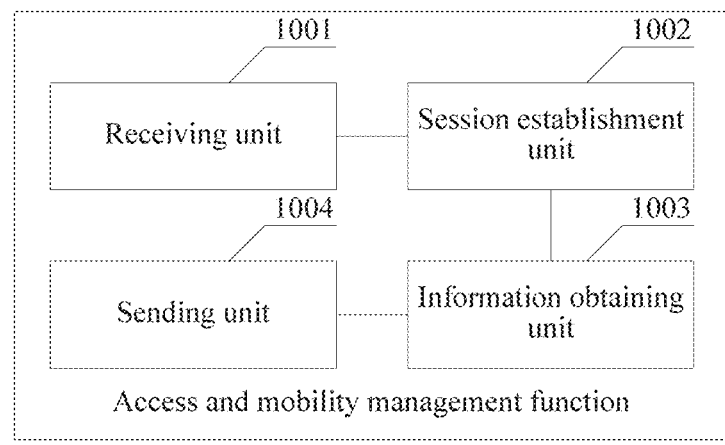
FIG. 10 is a schematic structural diagram of an access and mobility management function according to an embodiment of the present application.

FIG. 10 is a possible schematic structural diagram of an access and mobility management function according to the foregoing embodiment. The access and mobility management function includes a receiving unit 1001 configured to receive a session establishment request sent by a terminal device, where the session establishment request requests to establish a session of a first slice identifier corresponding to a first target application. The access and mobility management function further includes a session establishment unit 1002 configured to establish a session for the terminal device, an information obtaining unit 1003 configured to obtain information about a network slice supported by the session, and a sending unit 1004 configured to return a session establishment complete message to the terminal device, where the session establishment complete message carries an identifier of the session and the information about the network slice supported by the session.

In an optional implementation, the information obtaining unit 1003 is configured to obtain a session attribute of the session from an SMF, where the session attribute includes the information about the network slice supported by the session.

Figure 11:
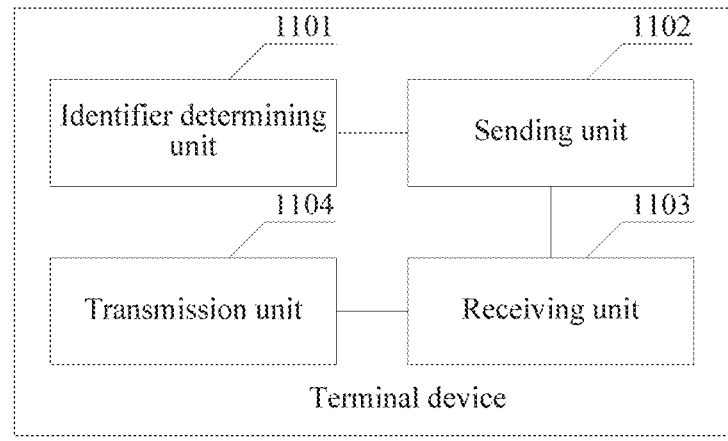
FIG. 11 is a schematic structural diagram of a terminal device according to an embodiment of the present application.

FIG. 11 is a possible schematic structural diagram of a terminal device according to the foregoing embodiment. The terminal device includes an identifier determining unit 1101 configured to determine a second slice identifier corresponding to a second target application, a sending unit 1102 configured to send a session establishment request to an AMF, where the session establishment request carries the second slice identifier, and a receiving unit 1103 configured to receive a session establishment rejection message returned by the AMF, where the session establishment rejection message indicates an identifier of a first session, the first session is a session established between the terminal device and a network side, and the first session supports the second slice identifier. The terminal device further includes a transmission unit 1104 configured to transmit data of the second target application using the first session.

Figure 12:
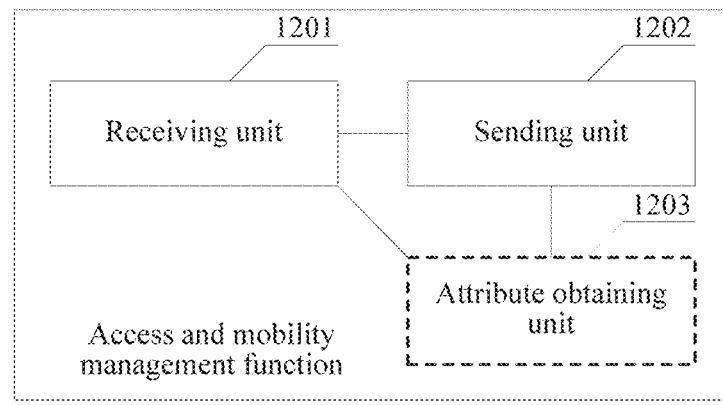
FIG. 12 is a schematic structural diagram of an access and mobility management function according to an embodiment of the present application.

FIG. 12 is a possible schematic structural diagram of an access and mobility management function according to the foregoing embodiment. The access and mobility management function includes a receiving unit 1201 configured to receive a session establishment request sent by a terminal device, where the session request carries a second slice identifier. The access and mobility management function further includes a sending unit 1202 configured to return a session establishment rejection message to the terminal device if a first session supports the second slice identifier, where the session establishment rejection message indicates an identifier of the first session, and the first session is a session established between the terminal device and a network side.

In an optional implementation, the access and mobility management function further includes an attribute obtaining unit 1203 configured such that before the sending unit returns the session establishment rejection message to the terminal device, the attribute obtaining unit 1203 obtains, by the AMF, a session attribute of the first session from an SMF, where the session attribute includes an identifier of a slice supported by the first session. Additionally, that a first session supports the second slice identifier includes: the identifier of the slice supported by the first session includes the second slice identifier.

It should be noted that in the embodiments of the present application, unit division is an example and is only logical function division. There may be other division manners in an actual implementation. Functional units in the embodiments of the present application may be integrated in one processing unit or exist as separate physical units, or two or more units are integrated in one unit. The integrated unit may be implemented in a form of hardware, or may be implemented in a form of a software functional unit. The following provides two possible solutions shown in FIG. 14 and FIG. 15.

Figure 13:
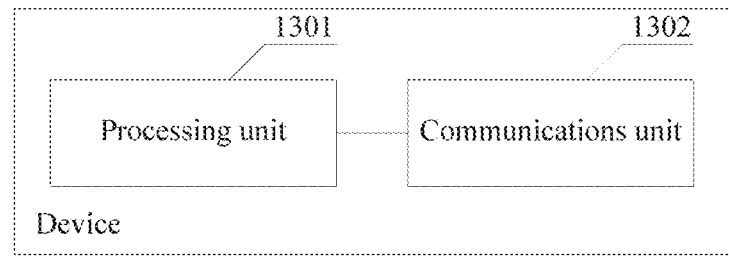
FIG. 13 is a schematic structural diagram of a device according to an embodiment of the present application.

As shown in FIG. 13, an embodiment of the present application further provides a device shown in FIG. 13. The device includes a processing unit 1301 and a communications unit 1302, and may further include a storage unit or other functional units. This is not uniquely limited in this embodiment of the present application.

1. The device shown in FIG. 13 may be used as the terminal device described in the foregoing embodiments.

In this case, in this embodiment, a function of the communications unit 1302 may be implemented as the functions of the receiving unit 702 and the sending unit 701 shown in FIG. 7. The processing unit 1301 can implement the function of the identifier determining unit 703. Correspondingly, the communications unit 1302 and the processor 1301 also respectively implement a corresponding communication function and other data processing functions in the foregoing method embodiments. Details are as follows below.

The processing unit 1301 is configured to send, using the communications unit 1302, configured network selection assistance information on the terminal device to an AMF, where the network selection assistance information includes a first slice identifier. The processing unit 1301 is further configured to receive, using the communications unit 1302, allowed network selection assistance information and indication information that are returned by the AMF, where the allowed network selection assistance information includes a second slice identifier, and the indication information indicates that the second slice identifier corresponds to the first slice identifier.

In an optional implementation, the processing unit 1301 is further configured to: after receiving, using the communications unit 1302, the allowed network selection assistance information and the indication information that are returned by the AMF, determine, based on a slice selection policy, that a target application corresponds to the first slice identifier, where the slice selection policy includes a correspondence between the target application and the slice identifier; determine, based on the indication information, that the first slice identifier corresponds to the second slice identifier; and transmit, using the communications unit 1302, data of the target application using a session corresponding to the second slice identifier.

In an optional implementation, that the processing unit 1301 is configured to transmit, using the communications unit 1302, data of the target application using a session corresponding to the second slice identifier includes the processing unit 1301 being configured to: send, using the communications unit 1302, a session establishment request including the second slice identifier to a network, establish the session corresponding to the second slice identifier, and transmit the data of the target application using the session corresponding to the second slice identifier; or if the terminal device has established the session corresponding to the second slice identifier, transmit the data of the target application using the session corresponding to the second slice identifier.

In an optional implementation, the session corresponding to the second slice identifier includes a PDU session corresponding to the second slice identifier.

In an optional implementation, that the processing unit 1301 is configured to send, using the communications unit 1302, configured network selection assistance information on the terminal device to an AMF includes the processing unit 1301 sending a registration request to the AMF, where the registration request carries the configured network selection assistance information on the terminal device.

That the processing unit 1301 is configured to receive, using the communications unit 1302, allowed network selection assistance information and indication information that are returned by the AMF includes the processing unit 1301 receiving, using the communications unit 1302, a registration request response message sent by the AMF, where the registration request response message carries the allowed network selection assistance information and the indication information.

2. The device shown in FIG. 13 may be used as the AMF described in the foregoing embodiments.

In this case, in this embodiment, a function of the communications unit 1302 may be implemented as the functions of the receiving unit 801 and the sending unit 803 shown in FIG. 8. The processor 1301 can implement the function of the information determining unit 802. Correspondingly, the communications unit 1302 and the processor 1301 also respectively implement a corresponding communication function and other data processing functions in the foregoing method embodiments. Details are as follows below.

The processing unit 1301 is configured to receive, using the communications unit 1302, configured network selection assistance information that is on a terminal device and that is sent by the terminal device, where the network selection assistance information includes a first slice identifier.

The processing unit 1301 is further configured to determine allowed network selection assistance information, where the allowed network selection assistance information includes a second slice identifier.

The processing unit 1301 is further configured such that if there is a correspondence between the second slice identifier and the first slice identifier, the processing unit 1301 sends the allowed network selection assistance information and indication information to the terminal device using the communications unit 1302, where the indication information indicates that the second slice identifier corresponds to the first slice identifier.

In an optional implementation, the processing unit 1301 is configured to receive, using the communications unit 1302, a registration request sent by the terminal device, where the registration request carries the configured network selection assistance information on the terminal device. Additionally, sending the allowed network selection assistance information and indication information to the terminal device includes sending a registration request response message to the terminal device, where the registration request response message carries the allowed network selection assistance information and the indication information.

3. The device shown in FIG. 13 may be used as the terminal device described in the foregoing embodiments.

In this case, in this embodiment, a function of the communications unit 1302 may be implemented as the functions of the receiving unit 902, the sending unit 903, and the transmission unit 904 shown in FIG. 9. The processor 1301 can implement the function of the identifier determining unit 903. Correspondingly, the communications unit 1302 and the processor 1301 also respectively implement a corresponding communication function and other data processing functions in the foregoing method embodiments. Details are as follows as below.

The processing unit 1301 is configured to send, using the communications unit 1302, a session establishment request to an AMF, to request to establish a session of a first slice identifier corresponding to a first target application.

The processing unit 1301 is further configured to receive, using the communications unit 1302, a session establishment complete message returned by the AMF, where the session establishment complete message carries an identifier of the newly established session, and a slice identifier supported by the session.

In an optional implementation, the processing unit 1301 is further configured such that after receiving, using the communications unit 1302, the session establishment complete message returned by the AMF, the processing unit 1301 determines, by the terminal device, a second slice identifier corresponding to a second target application.

The processing unit 1301 is further configured such that if the slice identifier supported by the session includes the second slice identifier, the processing unit 1301 transmits, using the communications unit 1302, data of the second target application using the session.

4. The device shown in FIG. 13 may be used as the AMF described in the foregoing embodiments.

In this case, in this embodiment, a function of the communications unit 1302 may be implemented as functions of the receiving unit 1001 and the sending unit 1004 shown in FIG. 10. The processor 1301 can implement the functions of the session establishment unit 1002 and the information obtaining unit 1003. Correspondingly, the communications unit 1302 and the processor 1301 also respectively implement a corresponding communication function and other data processing functions in the foregoing method embodiments. Details are as follows below.

The processing unit 1301 is configured to receive, using the communications unit 1302, a session establishment request sent by a terminal device, where the session establishment request requests to establish a session of a first slice identifier corresponding to a first target application.

The processing unit 1301 is further configured to establish a session for the terminal device, and obtain information about a network slice supported by the session.

The processing unit 1301 is further configured to return a session establishment complete message to the terminal device using the communications unit 1302, where the session establishment complete message carries an identifier of the session, and the information about the network slice supported by the session.

In an optional implementation, that the processing unit 1301 is configured to obtain information about a network slice supported by the session includes the processing unit 1301 being configured to obtain a session attribute of the session from an SMF using the communications unit 1302, where the session attribute includes the information about the network slice supported by the session.

5. The device shown in FIG. 13 may be used as the terminal device described in the foregoing embodiments.

In this case, in this embodiment, a function of the communications unit 1302 may be implemented as functions of the receiving unit 1103, the sending unit 1102, and the transmission unit 1104 shown in FIG. 11. The processor 1301 can implement the function of the identifier determining unit 1101. Correspondingly, the communications unit 1302 and the processor 1301 also respectively implement a corresponding communication function and other data processing functions in the foregoing method embodiments. Details are as follows below.

The processing unit 1301 is configured to determine a second slice identifier corresponding to a second target application.

The processing unit 1301 is configured to: send, using the communications unit 1302, a session establishment request to an AMF, where the session establishment request carries the second slice identifier; receive a session establishment rejection message returned by the AMF, where the session establishment rejection message indicates an identifier of a first session, the first session is a session established between the terminal device and a network side, and the first session supports the second slice identifier; and transmit data of the second target application using the first session.

6. The device shown in FIG. 13 may be used as the AMF described in the foregoing embodiments.

In this case, in this embodiment, a function of the communications unit 1302 may be implemented as functions of the receiving unit 1201 and the sending unit 1202 shown in FIG. 12. The processor 1301 can implement the function of the attribute obtaining unit 703. Correspondingly, the communications unit 1302 and the processor 1301 also respectively implement a corresponding communication function and other data processing functions in the foregoing method embodiments. Details are as follows below.

The processing unit 1301 is configured to receive, using the communications unit 1302, a session establishment request sent by a terminal device, where the session request carries a second slice identifier. Additionally, if a first session supports the second slice identifier, the processing unit 1301 is configured to return a session establishment rejection message to the terminal device, where the session establishment rejection message indicates an identifier of the first session, and the first session is a session established between the terminal device and a network side.

In an optional implementation, the processing unit 1301 is further configured such that before returning the session establishment rejection message to the terminal device using the communications unit 1302, the processing unit 1301 obtains a session attribute of the first session from an SMF using the communications unit 1302, where the session attribute includes an identifier of a slice supported by the first session. Additionally, that a first session supports the second slice identifier includes: the identifier of the slice supported by the first session includes the second slice identifier.

Figure 14:
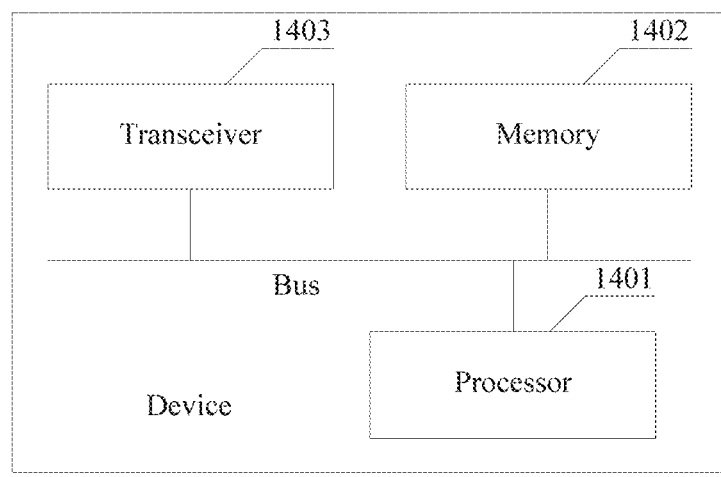
FIG. 14 is a schematic structural diagram of a device according to an embodiment of the present application.

Referring to FIG. 14, FIG. 14 shows a device according to an embodiment of the present application. The device includes a processor 1401, a memory 1402, and a transceiver 1403. The processor 1401, the memory 1402, and the transceiver 1403 are connected to each other using a bus.

The memory 1402 includes, but is not limited to, a random access memory (RAM), a read-only memory (ROM), an erasable programmable read only memory (EPROM), or a compact disc read-only memory (CD-ROM). The memory 1402 is configured to store related instructions and data. The transceiver 1403 is configured to receive and send data.

The processor 1401 may be one or more central processing units (CPU). When the processor 1401 is one CPU, the CPU may be a single-core CPU or a multi-core CPU.

The processor 1401 of the device is configured to read program code stored in the memory 1402, to perform the method provided in the embodiments of the present application. The transceiver 1403 is controlled by the processor 1401 to implement sending and receiving functions.

More specifically, if the device is used as a terminal device, the processor 1401 is configured to read the program code stored in the memory 1402, to perform any one of the methods performed by the terminal device in the embodiments of the present application. More details are as follows below.

A function of the transceiver 1403 may be implemented as functions of the receiving unit 702 and the sending unit 701 shown in FIG. 7. The processor 1401 can implement the function of the identifier determining unit 703. Correspondingly, the transceiver 1403 and the processor 1401 also respectively implement a corresponding communication function and other data processing functions in the foregoing method embodiments.

Alternatively, a function of the transceiver 1403 may be implemented as functions of the receiving unit 902, the sending unit 903, and the transmission unit 904 shown in FIG. 9. The processor 1401 can implement the function of the identifier determining unit 903. Correspondingly, the transceiver 1403 and the processor 1401 also respectively implement a corresponding communication function and other data processing functions in the foregoing method embodiments.

Alternatively, a function of the transceiver 1403 may be implemented as functions of the receiving unit 1103, the sending unit 1102, and the transmission unit 1104 shown in FIG. 11. The processor 1401 can implement the function of the identifier determining unit 1101. Correspondingly, the transceiver 1403 and the processor 1401 also respectively implement a corresponding communication function and other data processing functions in the foregoing method embodiments. Details are as follows below.

If the device is used as an access and mobility management function, the processor 1401 is configured to read the program code stored in the memory 1402, to perform any one of the methods performed by the access and mobility management function in the embodiments of the present application. More details are as follows below.

A function of the transceiver 1403 may be implemented as functions of the receiving unit 801 and the sending unit 803 shown in FIG. 8. The processor 1401 can implement the function of the information determining unit 802. Correspondingly, the transceiver 1403 and the processor 1401 also respectively implement a corresponding communication function and other data processing functions in the foregoing method embodiments.

Alternatively, a function of the transceiver 1403 may be implemented as functions of the receiving unit 1001 and the sending unit 1004 shown in FIG. 10. The processor 1401 can implement the functions of the session establishment unit 1002 and the information obtaining unit 1003. Correspondingly, the transceiver 1403 and the processor 1401 also respectively implement a corresponding communication function and other data processing functions in the foregoing method embodiments.

Alternatively, a function of the transceiver 1403 may be implemented as that of the receiving unit 1201 and the sending unit 1202 shown in FIG. 12. The processor 1401 can implement the function of the attribute obtaining unit 703. Correspondingly, the transceiver 1403 and the processor 1401 also respectively implement a corresponding communication function and other data processing functions in the foregoing method embodiments. Details are as follows below.

An embodiment of the present application provides a computer program. The computer program includes an instruction sequence. When the instruction sequence is executed, any one of the methods provided in the embodiments of the present application is performed.

An embodiment of the present application further provides a storage medium. The storage medium includes program code. When the program code is executed, the procedure of any one of the methods provided in the embodiments of the present application is performed.

According to another aspect, an embodiment of the present application provides a communications system. The system includes the AMF in the foregoing aspects. In another possible design, the system may further include another device, for example, an SMF or a terminal device that interacts with the core network interface device in the solutions provided in the embodiments of the present application.

Method or algorithm steps described in combination with the content disclosed in the present application may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, such that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a digital versatile disc (DVD)), a semiconductor medium (for example, a Solid State Disk (SSD)), or the like.

The objectives, technical solutions, and benefits of the present application are further described in detail in the foregoing embodiments. It should be understood that the foregoing descriptions are merely embodiments of the present application, but are not intended to limit the protection scope of the present application. Any modification, equivalent replacement, or improvement made within the spirit and principle of the present application shall fall within the protection scope of the present application.

What is claimed is:

1. A method for network slice, comprising:
   sending, by a device, configured network slice selection assistance information (NSSAI) to an access and mobility management function (AMF), wherein the configured NSSAI comprises at least one configured slice identifier including a first slice identifier;
   receiving, by the device, allowed NSSAI and indication information from the AMF, wherein the allowed NSSAI comprises at least one allowed slice identifier including a second slice identifier, wherein the indication information indicates a mapping between the at least one configured slice identifier and the at least one allowed slice identifier, wherein the mapping is usable for associating a target application to the second slice identifier in the at least one allowed slice identifier, and wherein the target application is associated with the first slice identifier in the at least one configured slice identifier;
   determining, based on a network slice selection policy (NSSP), that the target application corresponds to the first slice identifier in the at least one configured slice identifier, wherein the NSSP comprises a correspondence between the target application and the first slice identifier; and
   determining, based on the indication information, that the second slice identifier in the at least one allowed slice identifier corresponds to the target application.

2. The method according to claim 1, further comprising:
   transmitting data of the target application using a session corresponding to the second slice identifier.

3. The method according to claim 2, wherein the session corresponding to the second slice identifier comprises a protocol data unit (PDU) session corresponding to the second slice identifier.

4. The method according to claim 1, further comprising:
   sending, by the device, a session establishment request comprising the second slice identifier to a network;

establishing the session corresponding to the second slice identifier; and transmitting data of the target application using the established session corresponding to the second slice identifier.

5. The method according to claim 1, further comprising transmitting the data of the target application if there is a session corresponding to the second slice identifier, wherein the data of the target application is transmitted using the session corresponding to the second slice identifier.

6. The method according to claim 1, wherein sending, by the device, the configured NSSAI to the AMF comprises sending, by the device, a registration request to the AMF, wherein the registration request carries the configured NSSAI, and wherein receiving, by the device, the allowed NSSAI and the indication information from the AMF comprises receiving a registration request response message from the AMF, wherein the registration request response message carries the allowed NSSAI and the indication information.

7. A device, comprising:

a memory storage comprising instructions; and one or more processors in communication with the memory storage, wherein the one or more processors execute the instructions to:

send configured network slice selection assistance information (NSSAI) to an access and mobility management function (AMF), wherein the configured NSSAI comprises at least one configured first slice identifier including a first slice identifier;

receive allowed NSSAI and indication information from the AMF, wherein the allowed NSSAI comprises at least one allowed slice identifier including a second slice identifier, wherein the indication information indicates a mapping between the at least one configured slice identifier and the at least one allowed slice identifier, wherein the mapping is usable for associating a target application to the second slice identifier in the at least one allowed slice identifier, and wherein the target application is associated with the first slice identifier in the at least one configured slice identifier;

determine, based on a network slice selection policy (NSSP), that a target application corresponds to the first slice identifier in the at least one configured slice identifier, wherein the NSSP comprises a correspondence between the target application and the first slice identifier; and determine, based on the indication information, that the second slice identifier in the at least one allowed slice identifier corresponds to the target application.

8. The device according to claim 7, wherein the one or more processors execute the instructions to:

transmit, data of the target application using a session corresponding to the second slice identifier.

9. The device according claim 8, wherein the session corresponding to the second slice identifier comprises a protocol data unit (PDU) session corresponding to the second slice identifier.

10. The device according to claim 7, wherein, the one or more processors execute the instructions to:

send a session establishment request comprising the second slice identifier to a network;

establish the session corresponding to the second slice identifier, and transmit data of the target application using the established session corresponding to the second slice identifier.

11. The device according to claim 7, wherein the one or more processors execute the instructions such that if there is a session corresponding to the second slice identifier, the one or more processors transmit the data of the target application using the session corresponding to the second slice identifier.

12. The device according to claim 7, wherein sending the configured NSSAI to the AMF comprises the one or more processors executing the instructions to send a registration request to the AMF, wherein the registration request carries the configured NSSAI, and wherein receiving the allowed NSSAI and the indication information from the AMF comprises the one or more processors executing the instructions to receive a registration request response message from the AMF, wherein the registration request response message carries the allowed NSSAI and the indication information.

13. The device according claim 7, wherein the device is a terminal.

14. A method for network slice, comprising:

sending, by a device, configured network slice selection assistance information (NSSAI) to an access and mobility management function (AMF) wherein the configured NSSAI comprises at least one configured slice identifier including a first slice identifier;

receiving, by the AMF, the configured NSSAI from the device;

determining, by the AMF, allowed NSSAI, wherein the allowed NSSAI comprises at least one allowed slice identifier including a second slice identifier;

sending, by the AMF, the allowed NSSAI and indication information to the device, wherein the indication information indicates a mapping between the at least one configured slice identifier and the at least one allowed slice identifier; and receiving, by the device, the allowed NSSAI and the indication information from the AMF, wherein the mapping is usable for associating a target application to the second slice identifier in the at least one allowed slice identifier, and wherein the target application is associated with the first slice identifier in the at least one configured slice identifier.

15. The method according to claim 14, wherein receiving, by the AMF, the configured NSSAI from the device comprises receiving, by the function AMF, a registration request from the device, wherein the registration request carries the configured NSSAI configured for the device, and wherein sending, by the AMF, the allowed NSSAI and the indication information to the device comprises sending, by the AMF, a registration request response message to the device, wherein the registration request response message carries the allowed NSSAI and the indication information.

16. The method according to claim 14, further comprising:

transmitting, by the device, data of the target application using a session corresponding to the second slice identifier.

17. The method according to claim 14, further comprising:

sending, by the device, a session establishment request comprising the second slice identifier to a network;

establishing, by the device, the session corresponding to the second slice identifier;

transmitting, by the device, data of the target application using the established session corresponding to the second slice identifier.

18. The method according to claim 14, further comprising:
- determining if there is a session corresponding to the second slice identifier; and
- transmitting, by the device if there is the session, the data of the target application using the session corresponding to the second slice identifier.

19. A system, comprising:
an-access and mobility management function (AMF); and
a device configured to:
- send configured network slice selection assistance information (NSSAI) to the AMF, wherein the configured NSSAI comprises at least one configured slice identifier including a first slice identifier;
- receive allowed NSSAI and indication information from the function AMF, wherein the allowed NSSAI comprises at least one allowed slice identifier including a second slice identifier, wherein the indication information indicates a mapping between the at least one configured slice identifier and the at least one allowed slice identifier, wherein the mapping is usable for associating a target application to the second slice identifier in the at least one allowed slice identifier, and wherein the target application is associated with the first slice identifier in the at least one configured slice identifier;
- determine, based on a network slice selection policy (NSSP), that the target application corresponds to the first slice identifier in the at least one configured slice identifier, wherein the NSSP comprises a correspondence between the target application and the first slice identifier; and
- determine, based on the indication information, that the second slice identifier in the at least one allowed slice identifier corresponds to the target application, wherein the AMF is configured to:
- receive the configured NSSAI from the device;
- determine the allowed NSSAI; and
- send the allowed NSSAI and the indication information to the device.

20. The system according to claim 19, wherein the device is configured to:
- transmit data of the target application using a session corresponding to the second slice identifier.

21. The system according to claim 19, wherein the device is configured to:
- send a session establishment request comprising the second slice identifier to a network;
- establish the session corresponding to the second slice identifier; and
- transmit data of the target application using the established session corresponding to the second slice identifier.

22. The system according to claim 19, wherein the device is configured such that if there is a session corresponding to the second slice identifier, the device transmits the data of the target application using the session corresponding to the second slice identifier.

23. The system according to claim 19, wherein the AMF is configured to receive a registration request from the device, wherein the registration request carries the configured NSSAI, and
wherein the AMF is configured to send a registration request response message to the device, wherein the registration request response message carries the allowed NSSAI and the indication information.

* * * * *

UNITED STATES PATENT AND TRADEMARK OFFICE
CERTIFICATE OF CORRECTION

PATENT NO. : 10,659,952 B2
APPLICATION NO. : 16/388616
DATED : May 19, 2020
INVENTOR(S) : Yuan Wang and Zhongping Chen It is certified that error appears in the above-identified patent and that said Letters Patent is hereby corrected as shown below:

On the Title Page

Page 2, 2nd Column, Line 20: "7oreign Communication" should read "Foreign Communication".

In the Claims

Claim 10, Column 29, Line 65: "identifier, and transmit" should read "identifier; and transmit".

Claim 14, Column 30, Line 23: "function (AMF) wherein" should read "function (AMF), wherein".

Signed and Sealed this
Seventh Day of July, 2020

Andrei Iancu
*Director of the United States Patent and Trademark Office*